May 5, 1925.

S. FIORONI ET AL 1,536,884

SPRING AND SHOCK ABSORBER

Filed March 31, 1922     2 Sheets-Sheet 1

S. Fioroni, and
A. Zaninelli
INVENTORS

May 5, 1925.

S. FIORONI ET AL 1,536,884

SPRING AND SHOCK ABSORBER

Filed March 31, 1922    2 Sheets-Sheet 2

S. Fioroni, and
A. Zaninelli   INVENTORS

BY Victor J. Evans
ATTORNEY

WITNESS:

Patented May 5, 1925.

1,536,884

UNITED STATES PATENT OFFICE.

STEVE FIORONI AND ANTHONY ZANINELLI, OF AVELLA, PENNSYLVANIA.

SPRING AND SHOCK ABSORBER.

Application filed March 31, 1922. Serial No. 548,457.

*To all whom it may concern:*

Be it known that we, STEVE FIORONI and ANTHONY ZANINELLI, citizens of the United States, residing at Avella, in the county of Washington and State of Pennsylvania, have invented new and useful Improvements in Spring and Shock Absorbers, of which the following is a specification.

This invention relates to a vehicle spring and shock absorber, and the object is to provide an improved construction, by the use of which the principal springs are relieved of excessive strain and therefore rendered more durable, and at the same time a greater degree of comfort in riding may be realized.

A further object is to employ in connection with a leaf spring, an additional resilient element in the form of a single longitudinally extending element, which in one form of the construction constitutes, in a sense, the chord of the arch formed by the leaf spring, and to provide in connection with said construction adjustable resilient devices for varying the degree of compression.

With the foregoing and other objects in view, the invention consists in the novel construction and arrangement of elements described and claimed, it being understood that modifications may be made within the scope of the claim, without departing from the spirit of invention.

Figure 4:
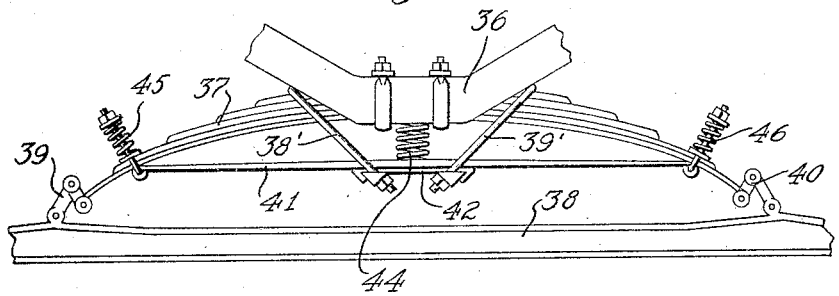
Figure 5:
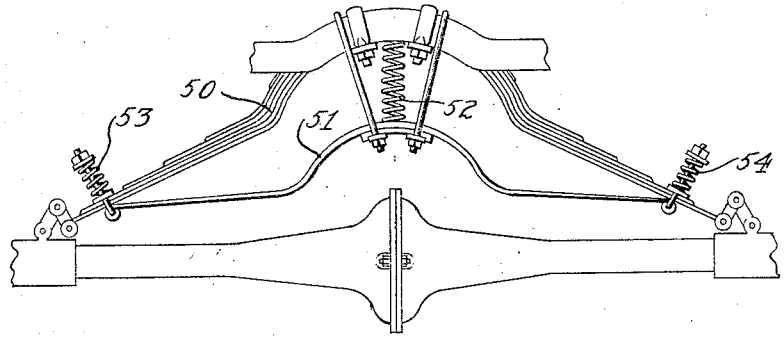
Figure 6:
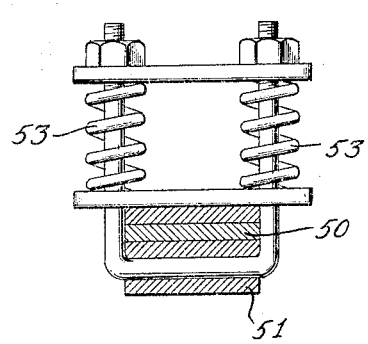
Figure 7:
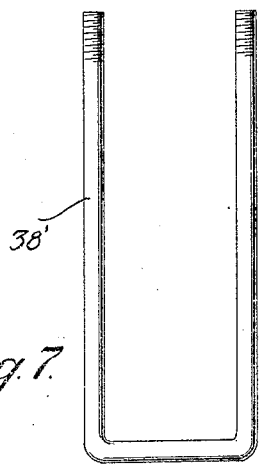

In the drawings, Figure 1 shows the spring and shock absorber in elevation, the main leaf spring extending transversely just above the axle; Figure 2 is a plan view of the resilient element 13 of Figure 1; Figure 3 illustrates, in elevation, a form in which the leaf spring extends transversely below the axle; Figures 4 and 5 are views in elevation, showing the mounting of the resilient elements of the device with reference to the front and rear axles of a particular type of car; Figure 6 shows a pair of coiled springs and the manner of mounting them with reference to springs 50, 51, of Figure 5; Figure 7 shows one of the tying devices to be employed in the manner illustrated in Figure 4.

In that form of the device to be employed where the leaf spring extends transversely of the front axle, the latter is designated 10, the leaf spring is shown at 12, and an additional spring or shock absorbing element is designated 13.

Two clamps, or clips, 14 and 15 extend around the spring 13 and are retained in correct spaced relation by a plate 15 having end lugs 17 engaged by the clips. These clips are secured at 18 and 19.

A coiled compression spring 20 mounted between the clips and between the leaf springs and spring 13, and relieves excessive strain in a direction perpendicular to the axle.

U-shaped clamps 23 and 24 engage the upturned ends 25 and 26 of spring 13, and pass around leaf spring 12 and through a plate 27, the legs of these clamps being encircled by coiled springs 28 and 29. These springs last named are adjustable by means of threaded elements 30.

In mounting the leaf spring 31 below axle 32, as shown in Figure 3, the additional spring 34 passes over the top of the axle, and the other parts are in the same relative position with reference to these two springs.

In Figure 4, the leaf spring 37, secured at 36, extends longitudinally of the axle 38, mounting devices of the usual construction being shown at 39 and 40. The additional spring 41 constitutes a chord of arch formed by spring 37, and in this case the U-shaped clips 38' and 39' are to be mounted at about the angle shown. They pass around springs 37 and 41, and the spacing device is shown at 42, the central compression spring being designated 44. Adjusting springs 45 and 46 serve the purpose previously indicated.

Figure 5, illustrates a construction operating on the same principle, but the rear leaf spring 50 presents on each side of the central portion thereof a compound curve, the additional or shock absorbing spring 51 being similarly curved. A central compression spring 52 is mounted as before, and adjustable coiled springs are shown at 53 and 54, at each end of the spring 51.

Having thus described the invention what is claimed is:

The combination with a leaf spring, of a spring extending longitudinally of the leaf spring, a coiled spring between the middle portions of the first and second named springs, tying devices connected with the second named spring and extending around the spring first named, and means connected with the ends of the tying devices and spacing them with reference to each other and equally with reference to the three springs specified, U shaped devices connected with the ends of the second named spring and passing around the leaf spring near its ends, coiled springs on the legs of each U shaped device, projecting outwardly at an abrupt angle from the leaf spring, and placed under compression by the flexing, under compression, of the first and second named springs.

In testimony whereof we affix our signatures.

STEVE FIORONI.
ANTHONY ZANINELLI.